United States Patent [19]

Hirabayashi et al.

[11] Patent Number: 5,547,429
[45] Date of Patent: Aug. 20, 1996

[54] AUTO-TENSIONER

[75] Inventors: Katsumi Hirabayashi, Anjo; Daigo Usa, Kariya, both of Japan

[73] Assignee: Aisin Seiki Kabushiki Kaisha, Kariya, Japan

[21] Appl. No.: 323,345

[22] Filed: Oct. 14, 1994

[30] Foreign Application Priority Data

Oct. 14, 1993 [JP] Japan .................................. 5-256619

[51] Int. Cl.$^6$ ...................................................... F16H 7/08
[52] U.S. Cl. ........................................ 474/110; 474/138
[58] Field of Search .................................. 474/110, 135, 474/138

[56] References Cited

U.S. PATENT DOCUMENTS

| | | | |
|---|---|---|---|
| 4,695,268 | 9/1987 | Kodama et al. | 474/110 |
| 4,708,696 | 11/1987 | Kimura et al. | 474/138 X |
| 4,904,230 | 2/1990 | Kawashima et al. | 474/135 X |
| 4,909,777 | 3/1990 | Inoue et al. | 474/110 |
| 4,950,209 | 8/1990 | Kawashima et al. | 474/110 X |
| 4,976,660 | 12/1990 | Breindl | 474/135 |
| 4,997,410 | 3/1991 | Polster et al. | 474/110 |
| 5,248,282 | 9/1993 | Suzuki | 474/110 |
| 5,310,385 | 5/1994 | Suzuki | 474/110 |
| 5,383,813 | 1/1995 | Odai | 474/110 |

FOREIGN PATENT DOCUMENTS 3-13647  3/1991  Japan .

Primary Examiner—Roger J. Schoeppel
Attorney, Agent, or Firm—Oblon, Spivak, McClelland, Maier & Neustadt, P.C.

[57] ABSTRACT

The characteristics of the auto-tensioner of the present invention resides in a second reservoir chamber 24 which resides within a plunger 11 extending toward inside of a spring 15.

Accordingly, without changing the whole length of a cylinder 10, sufficient amount of operating oil can be reserved and the smooth flow of operating oil into a pressure chamber 23 from the second reservoir 24 chamber can be conducted.

3 Claims, 3 Drawing Sheets

AUTO-TENSIONER

BACKGROUND OF THE INVENTION

1. Field of the Invention

The present invention relates to an auto-tensioner which holds tension of wrapping connecting members such as endless toothed belt and chain to be the predetermined tension.

2. Description of the Related Art

As the conventional auto-tensioner of this kind, the auto-tensioner described in Japanese Examined Utility Model Publication No. 13647/1991 (Kokoku) has been known. This conventional auto-tensioner comprises: an oil seal provided at the other side of the inside of a cylinder having a closed end at one side; a piston which is slidably connected with one end of a rod which slidably passes through on oil sheet while a little clearance to the inside diameter surface of a cylinder is kept; at the piston and the rod, a passage which communicates with a pressure chamber formed at one side of the the piston and a reservoir chamber formed at the other side of the piston; a check valve provided to open the passage when the pressure of the pressure chamber becomes lower than that of the reservoir chamber; and a spring incorporated to assign the property of projection to the rod at the inside of the reservoir chamber.

The above-mentioned conventional auto-tensioner has the following disadvantages. The reservoir chamber is provided only at the opposite side of the pressure chamber of the piston. Accordingly, if the whole length of the auto-tensioner is reduced by shortening the axial length of the reservoir chamber, the volume of the reservoir chamber is reduced and the sufficient amount of operating oil cannot be reserved. Therefore, operating oil falls short and the air may flow into the pressure chamber so that the function of auto-tensioner may be deteriorated. If the function of auto-tensioner is deteriorated, traps of the belt and irregular sound are generated, and it also leads to reduce the lifetime of the belt.

SUMMARY OF THE INVENTION

It is an object of the present invention to secure enough operating oil reserved in the reservoir chamber and ensure the flow of operating oil into the pressure chamber even if the whole length of the cylinder is shortened.

The present invention has been developed in view of the above-mentioned problems. The auto-tensioner of the present invention comprises: a cylinder whose one end is formed with a closed end and whose the other end is opened; a plunger slidably contained in the cylinder having a little clearance; a pressure chamber formed by sectioning by the cylinder and the plunger; a first reservoir chamber which communicates with the pressure chamber through a little clearance formed at the inside of the cylinder; a seal member which prevents the communication between the first reservoir chamber and the outside air; an air chamber positioned between the first reservoir chamber and the seal member; a red connected with one end of the plunger while slidably penetrating the seal member; a check valve which opens the passage when the pressure of the pressure chamber becomes lower than that of the first reservoir chamber; and a coil spring which is provided at the inside of the pressure chamber and which energizes the plunger toward the other end side; wherein the plunger projects toward the shaft center space of the coil spring at the center portion thereof; the plunger includes a second reservoir chamber which communicates with the first reservoir chamber; and the check valve is provided between the second reservoir chamber and the pressure chamber.

The second reservoir chamber is provided so as to project from the center portion of the plunger toward the pressure chamber side. Accordingly, the volume of the first reservoir chamber can be reduced so that the length of the auto-tensioner can be reduced corresponding to that amount. The operating oil is reserved also at the second reservoir chamber, therefore, the shortage of operating oil is not occurred and the flowing air into the pressure chamber is reduced so that the reliability of the function of the auto-tensioner can be improved.

By providing the second reservoir chamber at the inside of the plunger at the the pressure chamber side, the sufficient amount of operating oil can be reserved. Accordingly, the generation of air can be reduced, and the reliability of the function of the auto-tensioner can be improved. Also by extending the other end of the plunger, which forms the second reservoir chamber, toward the inside of the spring, the sufficient amount of operating oil can be secured at the reservoir chamber without changing the whole length of the cylinder. Furthermore, by providing the reservoir chamber just in front of the check valve, the smooth flow of operating oil into the pressure chamber can be conducted.

BRIEF DESCRIPTION OF THE DRAWING

A more complete appreciation of the present invention and many of its advantages will be readily obtained as the same becomes better understood by reference to the following detailed description when considered in connection with the accompanying drawing and detailed specification, all of which forms a part of the disclosure.

DETAILED DESCRIPTION OF THE PREFERRED EMBODIMENT

Figure 1:
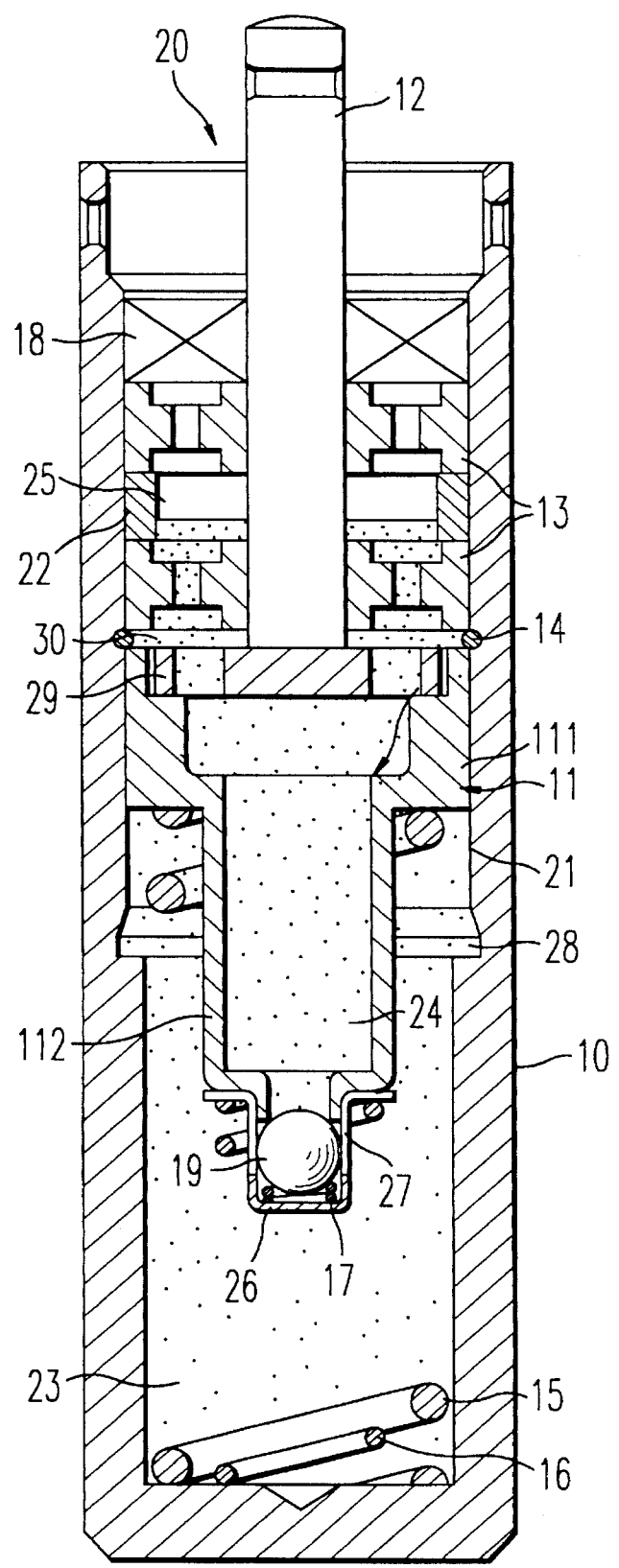
FIG. 1 is a cross-sectional view of the auto-tensioner described in a preferred embodiment according to the present invention.

Having generally described the present invention, a further understanding can be obtained by reference to the specific preferred embodiment which is provided herein for purposes of illustration only and are not intended to limit the scope of the appended claim.

A preferred embodiment of this invention will be hereinafter described with reference to the drawing.

As shown in FIG. 1, the auto-tensioner comprises: a cylinder 10; a plunger 11; a rod 12; rod guides 13 and 13; a snap ring 14; a spring 15; an oil seal 18; and a check valve 19.

As shown in the lower portion of FIG. 1, one end of the cylinder 10 is closed and the other end, shown in the upper portion of the figure, forms an opening hole 20. A plunger 11 is inserted into the hole 20 with a little clearance 21. As shown in the upper portion of FIG. 1, at one end of the plunger 11, the rod 12 is connected to a plate 30 in a circumferential shape. This rod 12 penetrates the center portion of rod guides 13 and 13, and the rod 12 is slidably contained in the inside of the cylinder 10. These rod guides 13 and 13 are fixed to the cylinder 10 and between the rod guides 13 and 13, a sleeve 22 is provided. At the upper portion of the rod guides 73 and 73, an oil seal 78 is fixed.

Into the other end of the plunger 11 shown in the bottom portion of FIG. 1, springs 15 and 16 are inserted. By these springs 15 and 16, the property of projection for projecting the red 12 is given. However, by snap ring 14, the sliding amount thereof is regulated. A first reservoir chamber 30 is formed between the plunger 11 and red guides 13 and 13. A pressure chamber 23 is formed between the plunger 11 and the closed end of the cylinder 10. Furthermore, the center portion of the plunger 11 projects toward the pressure chamber 23 and a second reservoir chamber 24 is formed there. The pressure chamber 23 communicates with the first reservoir chamber 30 through a small clearance between the inner wall surfaces of the plunger 11 and the cylinder 10. At the upper portion of the first reservoir 30, an air chamber 25 is positioned.

At the bottom end of the plunger 11 and of the portion at which the second reservoir chamber 24 is formed, a concave portion is formed. At the bottom portion of this concave portion, a check valve 19 is provided. This check valve 19 is held by a holding member 26. The holding member 26 is fixed by pressing by the plunger 11. The holding member 26 is pressed by the spring 16. The check valve 19 is energized toward the upper portion of FIG. 1 by the spring 17 which is provided between the holding member 26 and the check valve 19. By opening this check valve 19, a passage 27 is opened to supply operating oil to the pressure chamber 23 when the pressure of the pressure chamber 23 becomes lower than that of the second reservoir chamber 24.

The second reservoir chamber 24, which is the characteristic of the present invention, will be explained as follows.

The second reservoir chamber 24 is formed in the inside of the plunger 11, which is the upper portion of the check valve 19 as shown in FIG. 1.

Namely in the auto-tensioner, the plunger 11 comprises a base 111 which slidingly contacts the inner surface of the cylinder 10; a cylindrical portion 112 which projects toward the pressure chamber 23 from the center portion of one surface of the base 111; and the second reservoir chamber 24 which opens to the other surface side of the base 111 and which is formed in the inside of the base 111 and the convex portion.

Namely in the auto-tensioner, the coil spring 15 is held in a compressed state between the closed end and the surrounding surface of the convex portion 112 of the surface of the plunger 11.

And namely in the auto-tensioner, the check valve 19 is provided at the end of the cylindrical portion 112 of the plunger 11.

The cylinder 10 has a large inner peripheral portion where the plunger 11 slides and a small inner peripheral portion where the pressure chamber 23 exists. Furthermore, the cylinder 10 has a stepped portion 28 which circles in the circumferential direction at a boundary between the large inner peripheral portion and the small inner peripheral portion. The plunger 111 is bought into contact with the stepped portion 28 so that it cannot move further. The plunger 11 doesn't contact the lower end of the pressure chamber 23.

The effects of this preferred embodiment will be explained as follows.

The rod 12 and the plunger 11 are affected by the tension variation of the engine belt (not shown) through the tension roller and the roller arm. When the tension of the belt becomes higher than the predetermined tension, the red 12 and the plunger 11 move toward the downward direction (in FIG. 1) in opposition to the energizing force by the springs 15 and 16 so that the tension of the belt is reduced to be the predetermined tension. At this time, the pressure of operating oil inside of the pressure chamber 23 is increased so that operating oil inside of the pressure chamber 23 leaks to the first reservoir chamber 30 through clearance 21. Owing to this leak, the shocking load, affecting the belt, is relieved.

When the tension of belt becomes lower than the predetermined tension, the rod 12 and the plunger 11 move toward the upward direction (in FIG. 1) by the springs 15 and 16 so that the roller arm is pushed up, therefore the tension roller moves toward the direction in which the belt is extended. At this time, the rod 12 and the plunger 11 move together toward the upward direction (in FIG. 1). Accordingly, the pressure of the pressure chamber 23 is reduced so that the check valve 19 releases the passage 27 and operating oil smoothing flows into the pressure chamber 23 through the second reservoir chamber 24. Therefore the smooth movement of the rod 12 and the plunger 11 in response to the looseness of the belt is permitted so that the tension of the belt is kept constantly.

The second reservoir 24 is formed by extending toward the inside of the spring 15 so that the sufficient operating oil is secured in the second reservoir chamber 24 without changing the length of the cylinder 10. Accordingly, the smooth flow of operating oil into the pressure chamber 23 through the second reservoir chamber can be achieved.

Figure 2:
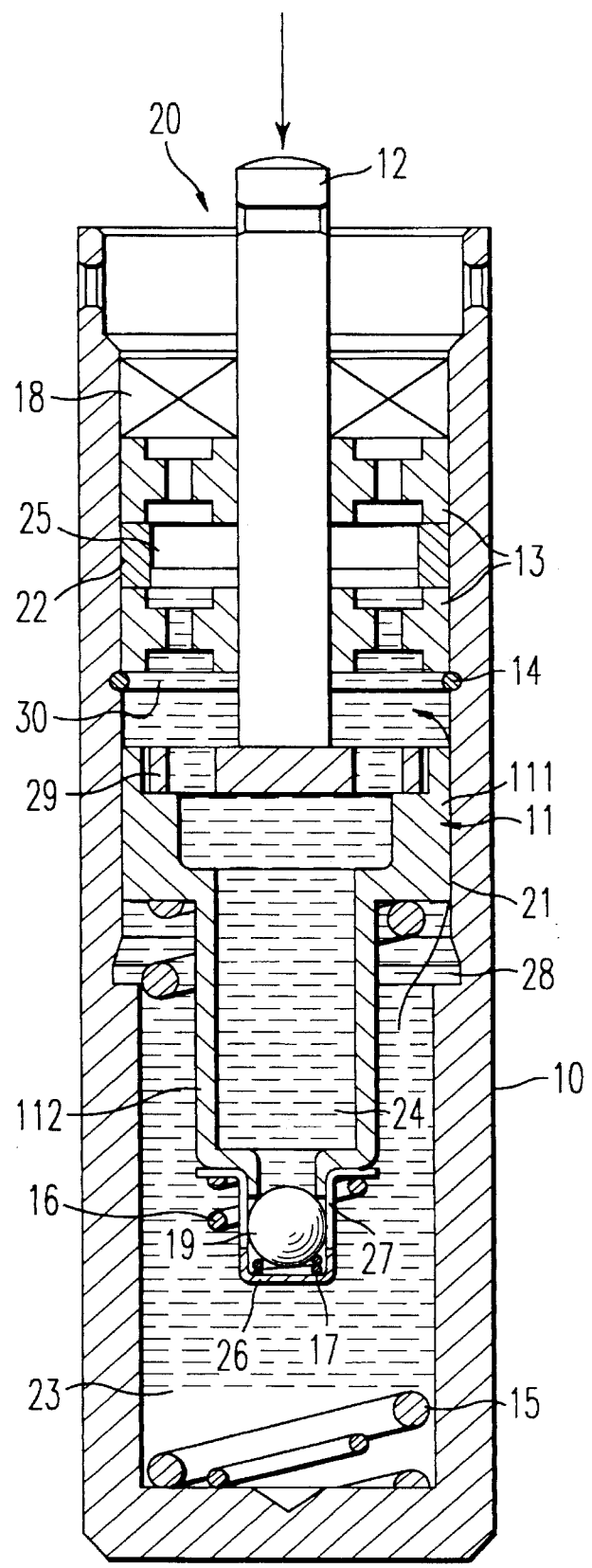
FIGS. 2 and 3 correspond to FIG. 1 but show other positions of the plunger.
Figure 3:
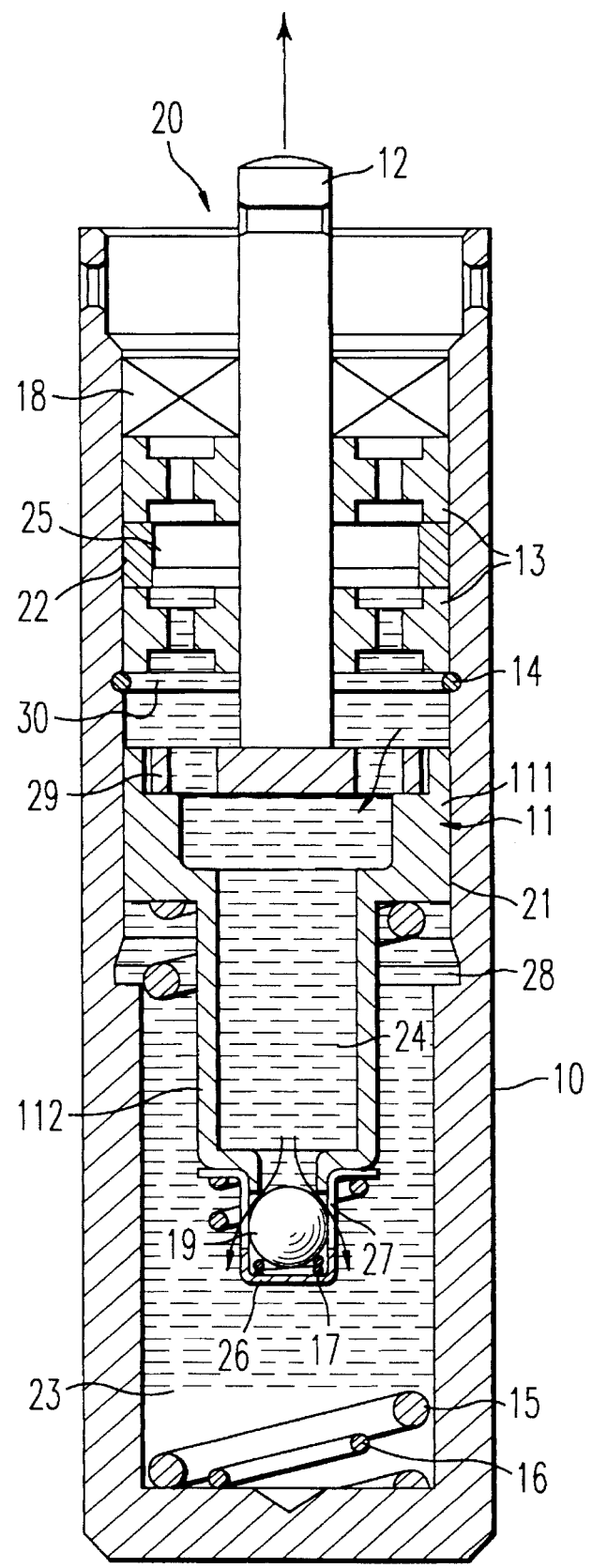

FIG. 2 shows the plunger 11 of FIG. 1 in a downward position where the oil in the pressure chamber 23 has flowed into the first reservoir chamber 30 through the passage 27 between the plunger 11 and the cylinder 10. The surface of the oil in the air chamber 25 has there risen. On the other hand, FIG. 3 shows the plunger 11, FIG. 1 having returned upward, so that the oil in the first reservoir chamber 30 and the second reservoir chamber 24 has flowed into the pressure chamber 23 through the opened check valve 19 and the passage 27.

Having now fully described the present invention, it will be apparent to one of ordinary skill in the art that many changes and modifications can be made thereto without departing from the spirit or scope of the present invention as set forth herein including the appended claim.

What is claimed is:

1. An auto-tensioner comprising:

a cylinder whose one end and is formed with a closed end and whose other end is opened;

a plunger slidably inserted into said cylinder with a small gap between its outer circumferential surface and an inner circumferential surface of said cylinder;

a pressure chamber formed between said one end of said cylinder and one end of said plunger;

a first reservoir chamber portion which communicates with said pressure chamber through said small gap;

a seal member disposed at the other end of said cylinder, wherein said first reservoir chamber portion is formed between said seal member and an other end of said plunger;

a rod connected with the other end of said plunger while slidably penetrating said seal member;

a check valve which is disposed at the one end of said plunger and which opens a passage formed in said plunger for communicating between said pressure chamber and said first reservoir chamber portion when the pressure of said pressure chamber becomes lower than that of said first reservoir chamber portion; and a coil spring disposed in said pressure chamber and engaging said plunger so as to urge said plunger toward the other end of said cylinder;

wherein said plunger is provided with a cylindrical portion having one end connected to said plunger, said cylindrical portion projecting from a region of engagement of said coil spring with said plunger into the axial center space of said coil spring at the center portion of one end thereof, wherein a second reservoir chamber portion which has a diameter greater than that of said passage and which communicates with said first reservoir chamber portion is formed in said cylindrical portion, and wherein said passage and said check valve are provided on an end of said cylindrical portion for controlling the communication between said pressure chamber and said first reservoir chamber portion through said second reservoir chamber portion, said check valve being positioned at the end of said cylindrical portion projected into said coil spring.

2. An auto-tensioner according to claim 1, wherein said plunger comprises a base portion which is slidingly inserted into said cylinder with said small gap and said cylindrical portion projects toward said pressure chamber from a center portion of one surface of said base portion; and wherein said second reservoir chamber opens toward the other surface side of said base portion and is formed in the inside of said base portion and said cylindrical portion.

3. An auto-tensioner according to claim 2, wherein said coil spring is held in a compressed state between said closed end of said cylinder and a surrounding surface of said cylindrical portion of said surface of said plunger.

* * * * *